US011328329B1

(12) United States Patent
Roberts et al.

(10) Patent No.: US 11,328,329 B1
(45) Date of Patent: May 10, 2022

(54) TELECOMMUNICATIONS INFRASTRUCTURE SYSTEM AND METHOD

(71) Applicant: Level 3 Communications, LLC, Broomfield, CO (US)

(72) Inventors: James Roberts, Broomfield, CO (US); Masum C. Muttalib, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 242 days.

(21) Appl. No.: 16/686,705

(22) Filed: Nov. 18, 2019

Related U.S. Application Data

(60) Provisional application No. 62/768,574, filed on Nov. 16, 2018.

(51) Int. Cl.
*G06Q 30/02* (2012.01)
*H04M 15/00* (2006.01)
*G06F 16/28* (2019.01)
*G06Q 30/04* (2012.01)
*G06Q 20/10* (2012.01)

(52) U.S. Cl.
CPC ....... *G06Q 30/0284* (2013.01); *G06F 16/289* (2019.01); *G06Q 20/102* (2013.01); *G06Q 30/04* (2013.01); *H04M 15/43* (2013.01); *H04M 15/58* (2013.01); *H04M 15/61* (2013.01); *H04M 15/8207* (2013.01)

(58) Field of Classification Search
CPC .............. G06Q 30/0206; G06Q 30/0283
USPC ............................................. 705/400
See application file for complete search history.

(56) References Cited

U.S. PATENT DOCUMENTS

| | | | | |
|---|---|---|---|---|
| 7,797,187 | B2 * | 9/2010 | Crean | G06Q 10/02 705/7.35 |
| 7,970,713 | B1 * | 6/2011 | Gorelik | G06Q 30/0206 705/400 |
| 7,979,329 | B2 * | 7/2011 | Cao | G06Q 30/0206 705/34 |
| 9,052,809 | B2 * | 6/2015 | Vesto | G06Q 10/06 |
| 10,200,541 | B2 * | 2/2019 | Raleigh | H04M 15/83 |
| 10,375,585 | B2 * | 8/2019 | Tan | G06N 3/0454 |
| 10,387,882 | B2 * | 8/2019 | Hagen | G06Q 20/4016 |
| 10,402,840 | B2 * | 9/2019 | Tibau-Puig | G06Q 30/0206 |
| 10,798,242 | B2 * | 10/2020 | Dunmire | H04M 3/5158 |
| 11,032,219 | B2 * | 6/2021 | Brady | H04L 51/066 |
| 11,043,812 | B2 * | 6/2021 | Epel | H02J 3/28 |
| 2015/0058148 | A1 * | 2/2015 | Grosz | G06Q 30/0283 705/26.2 |
| 2017/0206481 | A1 * | 7/2017 | Cheeran | G06F 16/148 |
| 2018/0082477 | A1 * | 3/2018 | Wilde | G06F 3/011 |
| 2018/0101877 | A1 * | 4/2018 | Song | G01C 21/3492 |

(Continued)

*Primary Examiner* — Andrew Joseph Rudy

(57) ABSTRACT

Directed to methods and systems for automated fee generation through the use of machine learning for telecommunications projects. Exemplary implementations may: receive, by a sales support microservice in communication with a trained model running on a server, a plurality of attributes; and feed the plurality of attributes to the trained model. The trained model can retrieve historical data regarding fee prices, identify similar historical projects based on final fee prices and historical attributes of the respective projects, and refine a correlation between historical attributes and fee prices, which can be used in the generation of a fee price to provision a telecommunications project as a result of those attributes.

20 Claims, 2 Drawing Sheets

(56) References Cited

U.S. PATENT DOCUMENTS

| | | | |
|---|---|---|---|
| 2019/0266690 A1* | 8/2019 | Mandeno | G06Q 30/0283 |
| 2020/0151743 A1* | 5/2020 | Acriche | G06Q 30/0202 |
| 2020/0160425 A1* | 5/2020 | Maiocco | G06Q 30/0635 |
| 2020/0202317 A1* | 6/2020 | Cassel | G06Q 20/12 |
| 2020/0302550 A1* | 9/2020 | Vollmert | G06N 20/00 |
| 2021/0089353 A1* | 3/2021 | Shear | G06F 9/5083 |

* cited by examiner

TELECOMMUNICATIONS INFRASTRUCTURE SYSTEM AND METHOD

CROSS-REFERENCE TO RELATED APPLICATION

This application is related to and claims priority under 35 U.S.C. § 119(e) from U.S. Patent Application No. 62/768,574, filed Nov. 16, 2018 entitled "Telecommunications Infrastructure System and Method," the entire contents of which is incorporated herein by reference for all purposes.

TECHNICAL FIELD

Embodiments of the present disclosure generally relate to systems and methods for automated fee generation, and more specifically to machine learning based fee generation for telecommunications projects.

BACKGROUND

In the telecommunications industry, fee pricing for proposed projects is typically determined on a case-by-case and negotiated basis. In many cases, neither party to a proposed project has knowledge of similar project pricing information. Further, where project pricing information is compared across projects, it is generally through a manual and time intensive process that is also error prone or limited to only a small subset of projects that may or may not in actuality be similar. As a result, time and energy is spent on manually generating a baseline fee price for a proposed project that is often renegotiated to a wholly different fee price. This greatly slows down the process of beginning provisioning of projects and results in uncertainty during early phases of project negotiation and highly variant fee pricing across projects that may otherwise be substantially similar to each other.

It is with these observations in mind, among others, that aspects of the present disclosure were concerned and developed.

SUMMARY

One aspect of the present disclosure relates to a system. The system may include one or more hardware processors configured by machine-readable instructions. The processor(s) may be configured to receive, by a sales support microservice in communication with a trained model running on a server, a plurality of attributes. The attributes may be descriptive of a project related to a communications network. The processor(s) may be configured to feed the plurality of attributes to the trained model. Training the model may include retrieving historical data including a collection of tuples. Each tuple may include a final fee price for provisioning a historical project and a plurality of historical attributes. Training the model may include identifying historical projects which are similar to each other based on one of the final fee price of each respective historical project or a portion of the plurality of historical attributes each respective historical project. Training the model may include refining a correlation between the historical attributes and the final fee price. The correlation is mappable, or able to be mapped or provide mappings, to the plurality of attributes. Training the model may include generating, by the trained model, a fee price for provisioning the project based on the plurality of attributes.

Another aspect of the present disclosure relates to a method. The method may include receiving, by a sales support microservice in communication with a trained model running on a server, a plurality of attributes. The attributes may be descriptive of a project related to a communications network. The method may include feeding the plurality of attributes to the trained model. Training the model may include retrieving historical data including a collection of tuples. Each tuple may include a final fee price for provisioning a historical project and a plurality of historical attributes. Training the model may include identifying historical projects which are similar to each other based on one of the final fee price of each respective historical project or a portion of the plurality of historical attributes each respective historical project. Training the model may include refining a correlation between the historical attributes and the final fee price. The correlation is mappable to the plurality of attributes. Training the model may include generating, by the trained model, a fee price for provisioning the project based on the plurality of attributes.

Yet another aspect of the present disclosure relates to a non-transient computer-readable storage medium having instructions embodied thereon, the instructions being executable by one or more processors to perform a method. The method may include receiving, by a sales support microservice in communication with a trained model running on a server, a plurality of attributes. The attributes may be descriptive of a project related to a communications network. The method may include feeding the plurality of attributes to the trained model. Training the model may include retrieving historical data including a collection of tuples. Each tuple may include a final fee price for provisioning a historical project and a plurality of historical attributes. Training the model may include identifying historical projects which are similar to each other based on one of the final fee price of each respective historical project or a portion of the plurality of historical attributes each respective historical project. Training the model may include refining a correlation between the historical attributes and the final fee price. The correlation is mappable to the plurality of attributes. Training the model may include generating, by the trained model, a fee price for provisioning the project based on the plurality of attributes.

These and other features, and characteristics of the present technology, as well as the methods of operation and functions of the related elements of structure, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

DETAILED DESCRIPTION

Historical project and negotiations data can be used to train a machine learning model to generate base fee prices at the outset of negotiating a telecommunications project fee price. For example, in deploying an enterprise network to a campus, various factors are taken into consideration in determining an initial price offered for taking on the telecommunications project. Labor, materials, regulatory fees, and the like factor into a price determination, as well as, for example and without imputing limitation, customer size, historical pricing for project of a similar type, historical pricing for projects for the same customer, etc.

Further, the initial base fee used often directly impacts the final settled-upon pricing of the project. As a result, determining an accurate initial base fee may be important in negotiating a project fee and so significant time and energy may be spent, prior to negotiating a project fee, in generating the initial base fee.

Historical data may be used to train a machine learning model to efficiently and automatically generate a base fee price for telecommunications projects. As a result, time and energy may be saved by utilizing the automatically generated base fee price. The trained machine learning model may use various types of data, from which features can be extracted and processed to predict a fee price based on learned mappings of features to pricing biases, or estimates. The mappings are learned through model training processes (e.g., supervised learning, etc.).

Additionally, the same trained model, or a different trained model, can identify historical projects that are similar to the project for which a base fee price is being generated. Project similarity may be determined along dimensions (e.g., total price value, location, initial fee price to negotiated price difference, etc.) or along complex and/or non-human interpretable dimensions, such as those identified by, for example and without imputing limitation, a deep neural network or the like. Nevertheless, the identified similar historical projects can be provided for further understanding of the various factors of determining and negotiating a telecommunications project price.

Figure 1:
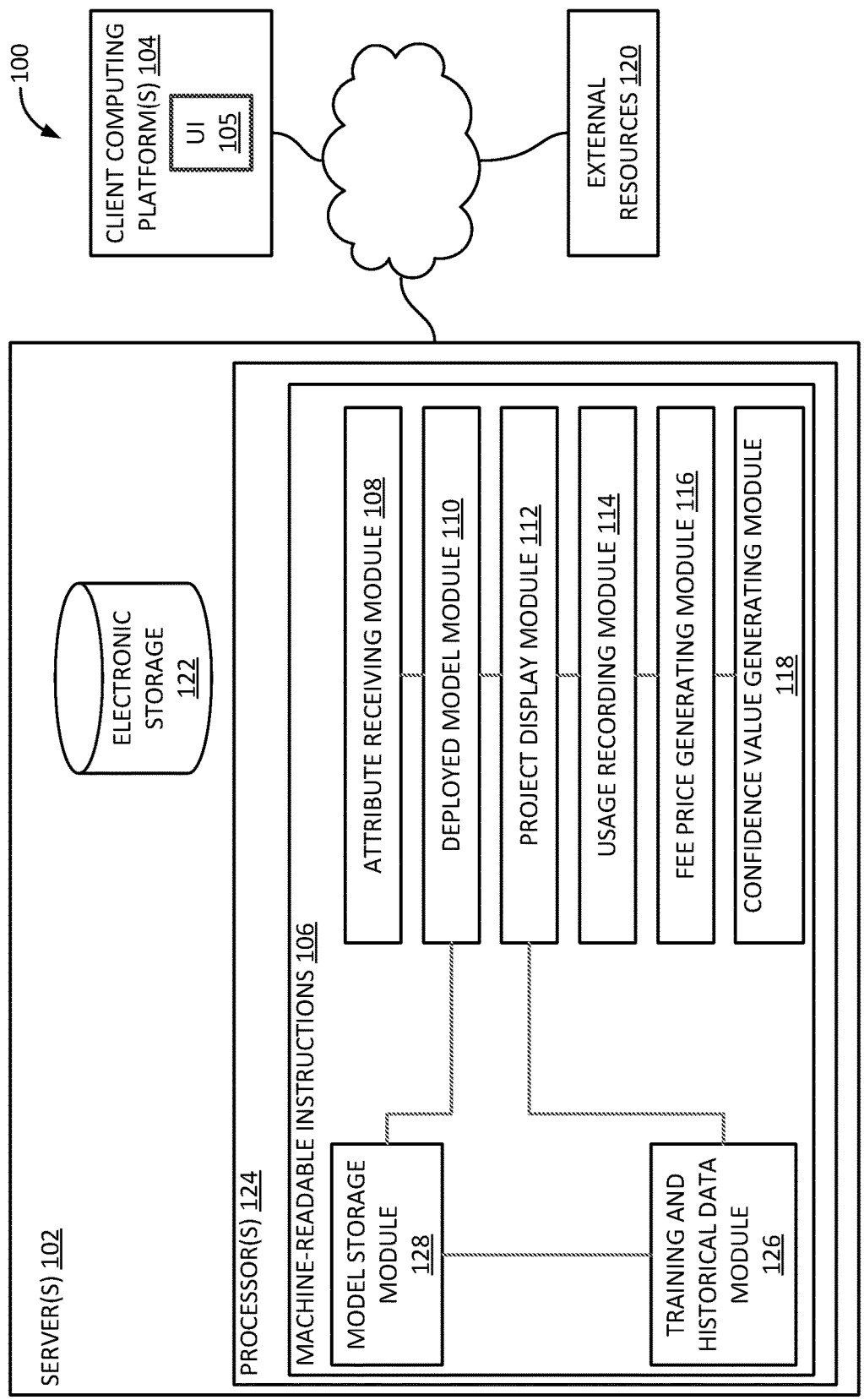
FIG. 1 illustrates a system configured to automatically generate a fee price for a project, in accordance with one or more implementations.

FIG. 1 illustrates a system 100, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform (s) 104.

Server(s) 102 may be configured by machine-readable instructions 106. Machine-readable instructions 106 may include one or more instruction modules. The instruction modules may include computer program modules. The instruction modules may include one or more of an attribute receiving module 108, a deployed model module 110, a display module 112, a usage recording module 114, a fee price generating module 116, a confidence value generating module 118, and/or other instruction modules.

Attribute receiving module 108 may be configured to, for example, receive a plurality of attributes to be provided to a sales support microservice in communication with a trained model running on a server. In some examples, the sale support microservice is one microservice of a plurality of microservices (e.g., forming a service mesh) that supports various information technology (IT) infrastructural processes and services. Sales teams may interface with the sales support microservice via an interface directly or through a third-party application offering integrations and the like.

The plurality of attributes may relate to various aspects of a project for installing, updating, modifying, or otherwise performing work on a communications network for a prospective or current customer. For example, attributes related to the customer, geographically local (to the customer) communications infrastructure and other environmental aspects, and/or other items having to do with provisioning the project, such as internal project load and schedules for a provider of the project, may be directly or indirectly among the plurality of attributes received by attribute receiving module 108. The attribute receiving module 108 can be communicatively linked to a client computing platform 104 to receive the attributes as input via a user interface 105.

The attributes may be provided, or "fed," to deployed model module 110 by attribute receiving module 108. Deployed model module 110 may ingest the attributes in order to classify the project associated with the attributes and/or generate a fee price for provisioning the project. The fee price may be used to negotiate a deal regarding provisioning the project. For example, the generated fee price can be provided to a sales client for negotiating purposes or may be further processed via downstream applications to provide an automated pricing service to purchasing clients via a website and the like. Deployed model module 110 may include one or more models that have been trained to classify projects and/or predict a fee to charge for the projects. In some examples, deployed model module 110 may include an ensemble model which aggregates outputs from a plurality of different models for classification and/or prediction purposes. Deployed model module 110 can retrieve the models from a model storage module 124, which may provide model selection, storage, and additional training processes for models deployed via deployed model module 110. Model storage module 124 may train models by accessing training and/or historical data via training and historical data module 126. Either or both of model storage module 124 and training and historical data module 126 can store data (e.g., historical data, training data, models, etc.) within electronic storage 122.

By way of non-limiting example, the plurality of attributes may include one or more of a customer channel, a vertical related to the prospective project, a location of the project, a customer size, a product type associated with the project, or a service type associated with the project. Additionally, the project may be part of a business-to-business transaction (e.g., provided to an enterprise customer such as in the case of a workplace intranet, etc.) or a business-to-consumer transaction (e.g., provided to a consumer customer such as a home network for an individual and the like).

Project display module 112 may be configured to display various outputs from modules 108, 110, 112, 114, 116, or 118. For example, project display module 112 may display (e.g., for a user, etc.) a classification or a fee price produced by deployed model module 110. Project display module 112 may also provide a visual prompt, in the form of a fillable field and the like, for providing attributes according to attribute receiving module 108 parameters. In some examples, project display module 112 can display historical projects similar to a project described by attributes provided to attribute receiving module 108. The historical projects can be identified via additional trained models, which may be trained through unsupervised learning and the like, performing a clustering based analysis or similar analysis for identifying similarities among large data sets. As a result, a user may utilize the historical models as, for example, exemplars for timelines, project scoping, costs, support needs, and the like.

Usage recording module 114 may be configured to record a usage of the generated fee price, such as, for example, during a negotiation and/or also as directly interacted with (e.g., clicked on, viewed, etc.) via a user interface (UI) 105. By way of non-limiting example, the usage may include one of transacting at the generated fee price, transacting within a range of the generated fee price, or directly interacting with the generated fee price (e.g., providing edits or modifications to the fee price, viewing the fee price, clicking the fee price, or other interface-based interactions that may be recorded through UI 105, etc.). In some examples, usage recording module 114 can record user behavior interacting with project display module 112 such as interface components selected, expanded, or interacted with, scrolling (e.g., via mouse wheel) patterns, time spent on particular interface items, and various other interactivities with a rendered user interface in order to determine optimal interface configuration and/or data provided.

Fee price generating module 116 may be configured to generate, by the trained model, a fee price range above or below the generated fee price. The fee price range may include additional fee prices at which the project may be provisioned. In some examples, the fee price range may be equal on either side of the generated fee price (e.g., a generated fee price with a +/−value indicating that any fee above or below the generated fee price of the +/−value has substantially similar qualities). The additional fee prices may include considerations such as likelihood of being accepted by a potential client or customer, profit margin, likelihood of being accurate (e.g., whether additional fees may arise throughout provisioning the project, etc.), and the like.

In some examples, the fee price range may be determined by a confidence threshold associated with the trained model of fee price generating module 116. For example, confidence bounds, such as a 5% for example and without imputing limitation, may cause fee price generating module 116 to include within the fee price range other fees falling within a 5% level of confidence (e.g., relative to confidence levels generated by confidence value generating module 118 discussed below) of the generated fee. In some other examples, a hard rule can be applied to generate fees within a predetermined monetary threshold of the generated fee price. In yet other examples, variance of fee prices overall may be used to determine the fee price range such as by determining a standard deviation of all fees across projects or across a selection of projects and including other fees prices in the fee price range that are within a single standard deviation, or the like. Further, various combinations and variations of the aforesaid examples may be used to generate the fee price range.

Confidence value generating module 118 may be configured to generate one or more confidence values associated with one of the generated fee price or one or more values within the fee price range. Generally, a confidence value will be within a range of 0 to 1.0, or 0% to 100%. Confidence values may indicate a confidence in a prediction that a model, ensemble, or other fee generating process determines in a generated fee being successful.

In some implementations, training the model may include retrieving historical data for contract projects including a final fee price and various other historical attributes. The data may be stored as a collection of tuples. In some implementations, each tuple may include a final fee price for provisioning a historical project and a plurality of historical attributes. Additionally, in some implementations, training the model may include identifying historical projects which are similar to each other based on one of the final fee price of each respective historical project or a portion of the plurality of historical attributes each respective historical project and other forms of clustering. Further, the tuples may be retrieved for rendering various interface information by, for example, project display module 112.

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor (s) 128 may be configured to execute modules 108, 110, 112, 114, 116, and/or 118, and/or other modules. Processor(s) 128 may be configured to execute modules 108, 110, 112, 114, 116, and/or 118, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, and/or 118 are illustrated in FIG. 1 as being implemented within a single processing unit, in implementations in which processor(s) 128 includes multiple processing units, one or more of modules 108, 110, 112, 114, 116, and/or 118 may be implemented remotely from the other modules. The description of the functionality provided by the different modules 108, 110, 112, 114, 116, and/or 118 described below is for illustrative purposes, and is not intended to be limiting, as any of modules 108, 110, 112, 114, 116, and/or 118 may provide more or less functionality than is described. For example, one or more of modules 108, 110, 112, 114, 116, and/or 118 may be eliminated, and some or all of its functionality may be provided by other ones of modules 108, 110, 112, 114, 116, and/or 118. As another example, processor(s) 128 may be configured to execute one or more additional modules that may perform some or all of the functionality attributed below to one of modules 108, 110, 112, 114, 116, and/or 118.

Figure 2:
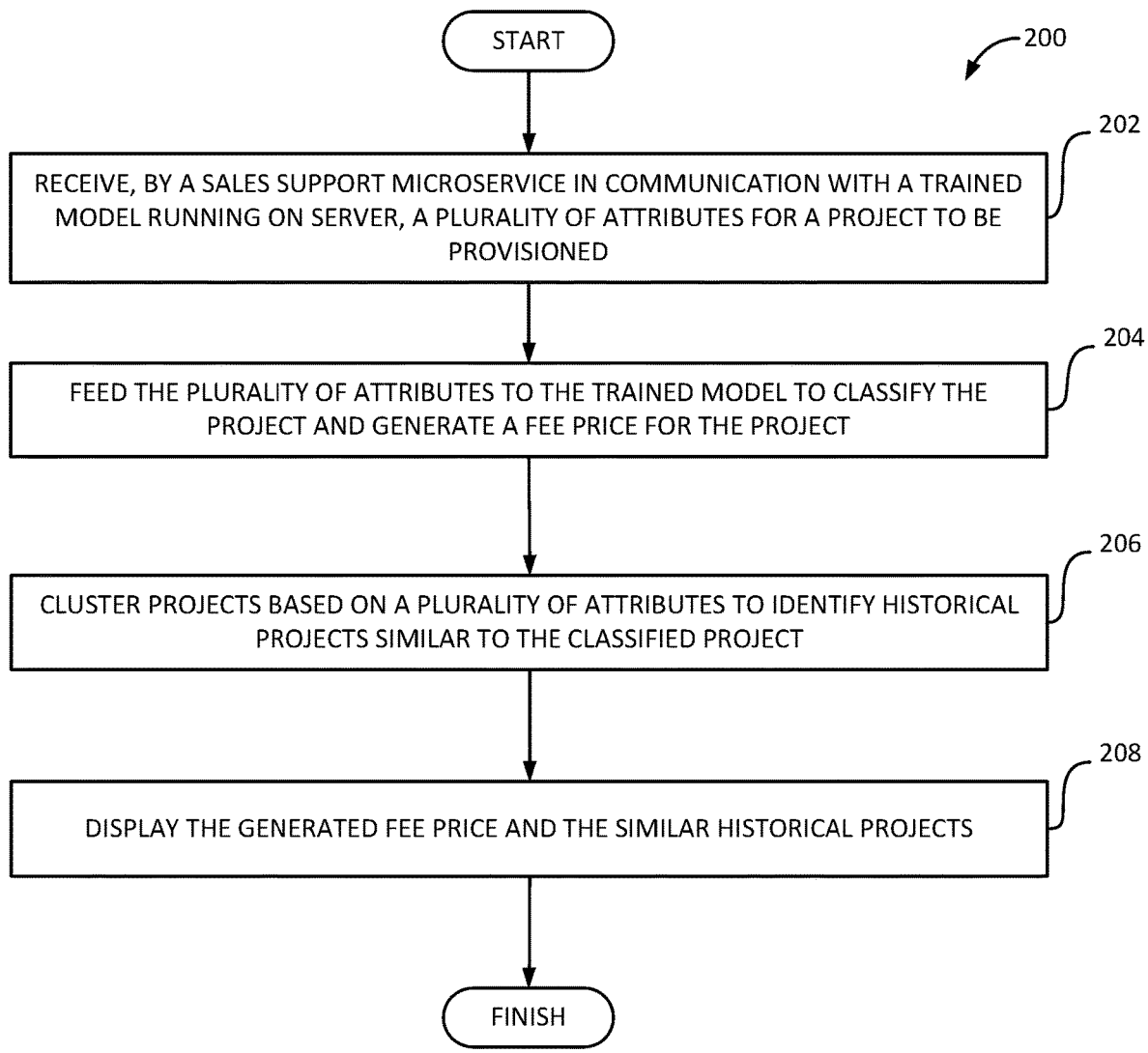
FIG. 2 illustrates a method for automatically generating a fee price for a project, in accordance with one or more implementations.

FIG. 2 illustrates a method 200 for generating a fee price for a project, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. Further, while method 200 is described below as deployed over a microservices architecture, it is understood that monolithic, mixed-architecture, and various other architectures may be used to execute some or all of method 200.

An operation 202 may include receiving, by a sales support microservice in communication with a trained model running on a server, a plurality of attributes. The sales support microservice may be an instantiated program within a service mesh accessible over a network (e.g., an enterprise network, virtual network, intranet, etc.) and provides access to various functionality for sales and/or customer service agents. The attributes may be descriptive of a project to be provisioned and the project may be related to a communications network (e.g., intranet installation, internet connection, etc.). Operation 202 may be performed by one or more hardware processors configured by machine-readable instructions including a module that is the same as or similar to attribute receiving module 108, in accordance with one or more implementations.

An operation 204 may include feeding the plurality of attributes to the trained model. Operation 204 may be performed by one or more hardware processors configured by machine-readable instructions including a module that is the same as or similar to deployed model module 110 and/or fee price generating module 116, in accordance with one or more implementations. The trained model, based on the ingested attributes, can classify the project and generate a fee price for the project. In some examples, the generated fee price may be based on the classification.

An operation 206 may include identifying historical projects that are similar to the classified project via clustering and the like. In some examples, the trained model of operation 202 above may also provide identification of similar historical projects. In some examples, a separate trained model may be used to identify the similar historical projects based on clustering analysis and the plurality of attributes. Operation 206 may be performed by one or more hardware processors configured by machine-readable instructions including a module that is the same as or similar to deployed model module 110. In some examples, a range of fee prices based on the generated fee price may be generated. Additionally, a confidence value in the generated fee price or the range of fee prices may be generated by one or more hardware processors configured by machine-readable instructions including a module that is the same as or similar to confidence value generating module 118.

An operation 209 may include displaying the generated fee price and the similar historical projects. Operation 208 may be performed by one or more hardware processors configured by machine-readable instructions including a module that is the same as or similar to project display model module 110, in accordance with one or more implementations. In some examples, a user may interact with the displayed information (e.g., via an interface, etc.) and the user interactions may be tracked and recorded by one or more hardware processors configured by machine-readable instructions including a module that is the same as or similar to usage recording module 114.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

We claim:

1. A system comprising:
one or more hardware processors configured by machine-readable instructions to:
train a machine learning model, wherein training the machine learning model comprises:
retrieving historical data comprising a collection of tuples, each tuple including a final fee price for provisioning a historical project and a plurality of historical attributes;
identifying historical projects which are similar to each other based on one of the final fee price of each respective historical project or a portion of the plurality of historical attributes each respective historical project; and
refining a correlation between the historical attributes and the final fee price, the correlation mappable to the plurality of attributes;
receive, by a microservice in communication with the trained machine learning model, a plurality of attributes, the plurality of attributes descriptive of a telecommunications project related to a communications network;
feed the plurality of attributes to the trained machine learning model; and
generate a fee price for provisioning the telecommunications project based on the plurality of attributes using the trained machine learning model.

2. The system of claim 1, wherein the one or more hardware processors are further configured by machine-readable instructions to display a one of the historical projects based on the received plurality of attributes, the displayed one of the historical projects associated with a tuple of the collection of tuples, the tuple including a plurality of historical attributes that are significantly similar to the received plurality of attributes.

3. The system of claim 1, wherein the one or more hardware processors are further configured by machine-readable instructions to record a usage of the generated fee price, the usage including one of transacting at the generated fee price, transacting within a range of the generated fee price, or directly interacting with the generated fee price.

4. The system of claim 1, wherein the one or more hardware processors are further configured by machine-readable instructions to generate, by the trained machine learning model, a fee price range above or below the generated fee price, the fee price range including additional fee prices at which the telecommunications project may be provisioned.

5. The system of claim 4, wherein the one or more hardware processors are further configured by machine-readable instructions to generate one or more confidence values associated with one of the generated fee price or one or more values within the fee price range.

6. The system of claim 1, wherein the plurality of attributes comprises one or more of a customer channel, a vertical related to the prospective sale, a location of the telecommunications project, a customer size, a product type associated with the telecommunications project, or a service type associated with the project.

7. The system of claim 1, wherein the project is a business-to-business transaction.

8. A method comprising:
training a machine learning model, wherein training the machine learning model comprises:
retrieving historical data comprising a collection of tuples, each tuple including a final fee price for provisioning a historical project and a plurality of historical attributes;
identifying historical projects which are similar to each other based on one of the final fee price of each respective historical project or a portion of the plurality of historical attributes each respective historical project; and
refining a correlation between the historical attributes and the final fee price, the correlation mappable to the plurality of attributes;
receiving, by a microservice in communication with the trained machine learning model, a plurality of attributes, the plurality of attributes descriptive of a telecommunications project related to a communications network;
feeding the plurality of attributes to the trained machine learning model; and
generating a fee price for provisioning the telecommunications project based on the plurality of attributes using the trained machine learning model.

9. The method of claim 8, further comprising displaying a one of the historical projects based on the received plurality of attributes, the displayed one of the historical projects associated with a tuple of the collection of tuples, the tuple including a plurality of historical attributes that are significantly similar to the received plurality of attributes.

10. The method of claim 8, further comprising recording a usage of the generated fee price, the usage including one of transacting at the generated fee price, transacting within a range of the generated fee price, or directly interacting with the generated fee price.

11. The method of claim 8, further comprising generating, by the trained machine learning model, a fee price range above or below the generated fee price, the fee price range including additional fee prices at which the telecommunications project may be provisioned.

12. The method of claim 11, further comprising generating one or more confidence values associated with one of the generated fee price or one or more values within the fee price range.

13. The method of claim 8, wherein the plurality of attributes comprises one or more of a customer channel, a vertical related to the prospective sale, a location of the project, a customer size, a product type associated with the telecommunications project, or a service type associated with the telecommunications project.

14. The method of claim 8, wherein the project is a business-to-business transaction.

15. A non-transient computer-readable storage medium having instructions embodied thereon, the instructions being executable by one or more processors to perform a method, the method comprising:
> training a machine learning model, wherein training the machine learning model comprises:
> retrieving historical data comprising a collection of tuples, each tuple including a final fee price for provisioning a historical project and a plurality of historical attributes;
> identifying historical projects which are similar to each other based on one of the final fee price of each respective historical project or a portion of the plurality of historical attributes each respective historical project; and
> refining a correlation between the historical attributes and the final fee price, the correlation mappable to the plurality of attributes;
> receiving, by a microservice in communication with the trained machine learning model running on a server, a plurality of attributes, the plurality of attributes descriptive of a telecommunications project related to a communications network;
> feeding the plurality of attributes to the trained machine learning model; and
> generate a fee price for provisioning the telecommunications project based on the plurality of attributes using the trained machine learning model.

16. The computer-readable storage medium of claim 15, wherein the method further comprises displaying a one of the historical projects based on the received plurality of attributes, the displayed one of the historical projects associated with a tuple of the collection of tuples, the tuple including a plurality of historical attributes that are significantly similar to the received plurality of attributes.

17. The computer-readable storage medium of claim 15, wherein the method further comprises recording a usage of the generated fee price, the usage including one of transacting at the generated fee price, transacting within a range of the generated fee price, or directly interacting with the generated fee price.

18. The computer-readable storage medium of claim 15, wherein the method further comprises generating, by the trained machine learning model, a fee price range above or below the generated fee price, the fee price range including additional fee prices at which the telecommunications project may be provisioned.

19. The computer-readable storage medium of claim 18, wherein the method further comprises generating one or more confidence values associated with one of the generated fee price or one or more values within the fee price range.

20. The computer-readable storage medium of claim 15, wherein the plurality of attributes comprises one or more of a customer channel, a vertical related to the prospective sale, a location of the telecommunications project, a customer size, a product type associated with the telecommunications project, or a service type associated with the telecommunications project.

* * * * *